United States Patent
Lendenmann et al.

(10) Patent No.: US 8,686,608 B2
(45) Date of Patent: Apr. 1, 2014

(54) SYNCHRONOUS RELUCTANCE MACHINE USING ROTOR FLUX BARRIERS AS COOLING CHANNELS

(71) Applicants: Heinz Lendenmann, Vasteras (SE); Vesa Osterholm, Vasteras (SE)

(72) Inventors: Heinz Lendenmann, Vasteras (SE); Vesa Osterholm, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/715,597

(22) Filed: Dec. 14, 2012

(65) Prior Publication Data

US 2013/0099607 A1 Apr. 25, 2013

Related U.S. Application Data

(63) Continuation of application No. PCT/EP2010/059265, filed on Jun. 30, 2010.

(51) Int. Cl.
*H02K 9/08* (2006.01)

(52) U.S. Cl.
USPC .......................................................... 310/61

(58) Field of Classification Search
USPC .................. 310/58, 59, 61–63, 60 A, 162
See application file for complete search history.

(56) References Cited

U.S. PATENT DOCUMENTS

| | | | |
|---|---|---|---|
| 3,675,056 A * | 7/1972 | Lenz ............................. | 310/54 |
| 3,684,906 A * | 8/1972 | Lenz ............................. | 310/61 |
| 5,831,367 A | 11/1998 | Fei et al. | |
| 6,234,767 B1 | 5/2001 | Takeda et al. | |
| 6,727,609 B2 * | 4/2004 | Johnsen ........................ | 310/52 |
| 7,411,323 B2 | 8/2008 | Pfannschmidt et al. | |
| 2006/0222528 A1 | 10/2006 | Shin et al. | |
| 2007/0024129 A1 | 2/2007 | Pfannschmidt et al. | |
| 2007/0024130 A1 | 2/2007 | Schmidt | |
| 2007/0108853 A1 | 5/2007 | Shah et al. | |
| 2008/0193275 A1 | 8/2008 | De Filippis et al. | |
| 2009/0230790 A1 * | 9/2009 | Weiss ............................ | 310/61 |

FOREIGN PATENT DOCUMENTS

| | | |
|---|---|---|
| JP | H02219447 A | 9/1990 |
| JP | H06261510 A | 9/1994 |
| JP | H11113202 A | 4/1999 |
| JP | 2004343915 A | 12/2004 |
| JP | 2006283752 A | 10/2006 |
| JP | 2007143389 A | 6/2007 |
| JP | 2008541686 A | 11/2008 |

OTHER PUBLICATIONS

International Search Report & Written Opinion of the International Searching Authority Application No. PCT/EP2010/059265 Completed: May 16, 2011; Mailing Date: May 26, 2011 10 pages.
Written Opinion of the International Preliminary Examining Authority Application No. PCT/EP2010/059265 Mailing Date: Jul. 11, 2012 7 pages.
Notice of Reasons for Rejection from the Japanese Patent Office Application No. 2013-517033 Issued: Jul. 2, 2013 3 pages.

* cited by examiner

*Primary Examiner* — Tran Nguyen
(74) *Attorney, Agent, or Firm* — St. Onge Steward Johnston & Reens LLC

(57) ABSTRACT

A synchronous reluctance machine includes a rotor having a plurality of rotor disks with longitudinal flux barriers. When the rotor disks are stacked together to form a rotor core, the flux barriers define channels extending in an axial direction of the rotor core. Air is forced to flow through these channels in order to improve a temperature distribution within the machine.

11 Claims, 3 Drawing Sheets

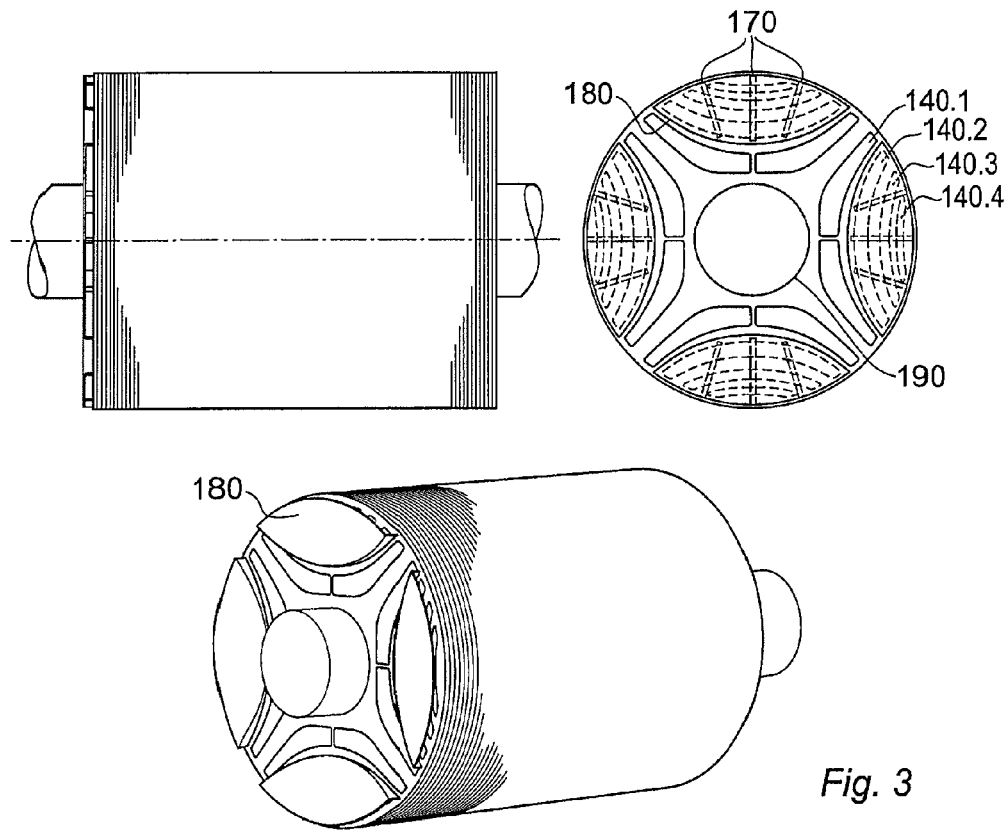
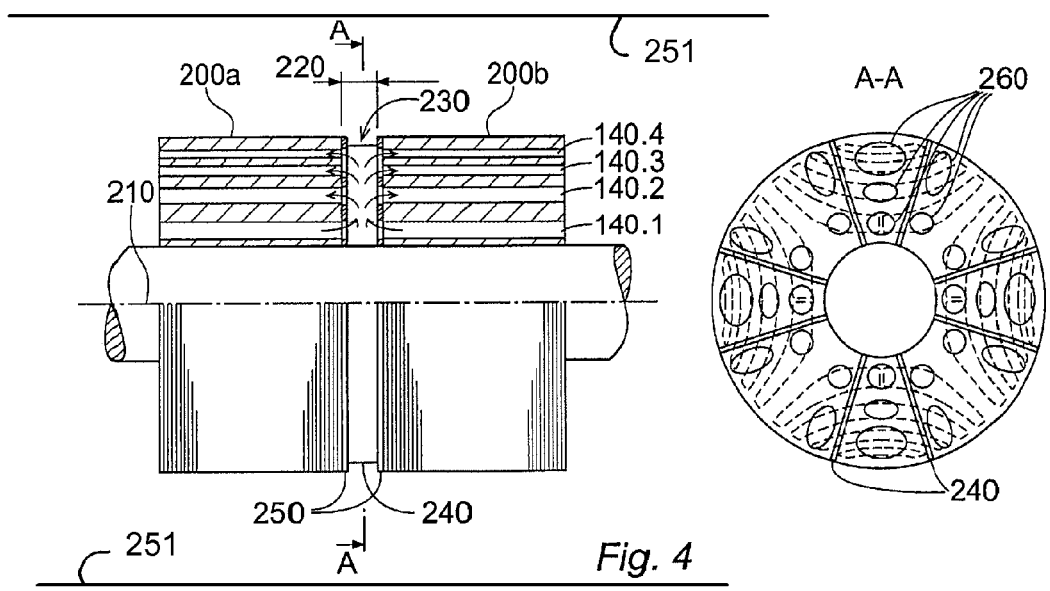
Fig. 3
Fig. 4

SYNCHRONOUS RELUCTANCE MACHINE USING ROTOR FLUX BARRIERS AS COOLING CHANNELS

FIELD OF THE INVENTION

The present invention relates to cooling of a synchronous reluctance machine (SynRM) wherein the inherent rotor structure of a SynRM is utilized to improve a temperature distribution within the machine.

BACKGROUND OF THE INVENTION

A SynRM utilizing solely the reluctance principle to create torque does not have any conductors in the rotor. Therefore, in comparison with induction machines and machines with field excitation windings, the rotor of a SynRM has significantly lower losses and thereby a lower operation temperature. Since it has been conventionally considered that a SynRM does not need cooling of the rotor, a conventional SynRM does not comprise air circulating means within the machine housing. The stator of a conventional SynRM is cooled by providing an external fan in a non-driving end (N-side) of the machine housing. The air flow from the fan is directed to follow the envelope surface of the machine housing. Because the fan is at one end of the machine and the cooling effect is higher closer to the fan, there is a significant temperature difference between the drive end (D-side) and the N-side of the machine.

U.S. Pat. No. 5,831,367 discloses a rotor for a synchronous reluctance machine. It has been mentioned on column 6, lines 37 to 40 that air circulation can be achieved by providing squirrel cage rings with fins. Cooling in the rotor according to U.S. Pat. No. 5,831,367 is required since the motor utilizes both reluctance principle and induction principle to create torque. It is the induced current in the squirrel cage conductor bars that mostly heats up the rotor, and the teaching of the required cooling can therefore not be directly applied to a machine not comprising any conductors on the rotor. Furthermore, U.S. Pat. No. 5,831,367 does not describe details about how the air is circulated within the machine housing.

Since a conventional SynRM does not comprise air circulating means within the machine housing, the interior of the machine housing does not comprise passage ways for circulating air. A typical rotor of a SynRM comprises axial passages through which air can flow, but since a typical stator does not have a return flow path through the stator or radial outside of the stator, providing the outer radius of the rotor with fins according to U.S. Pat. No. 5,831,367 would not cause air to effectively circulate within the machine housing. Modifications to the stator or the motor housing of a conventional SynRM would therefore be required in order to cause the air to circulate.

US 2006/0222528 discloses a synchronous reluctance machine wherein flux barriers are used as cooling channels. Gaseous refrigerant is forced to flow through the flux barriers in a single direction.

US 2007/0024130 discloses an asynchronous machine wherein cooling air is flowing in two opposite directions within the rotor through channels provided particularly for cooling purpose.

US 2007/0024129 discloses an asynchronous machine, more precisely an induction machine, wherein the rotor and the stator are provided with cooling channels extending in axial direction of the machine. Air is flowing in two opposite directions in different cooling channels before it is exhausted to the ambient of the machine housing. The channels in the rotor and the stator are provided particularly for cooling purpose, and the air is caused to flow in two directions in order to prevent non-uniform cooling between the opposite axial ends of the machine.

SUMMARY OF THE INVENTION

One object of the invention is to provide a SynRM with an improved temperature distribution within the machine.

This object is achieved by a synchronous reluctance machine comprising a rotor having a plurality of rotor disks.

The invention realizes that even if high temperature is conventionally not considered as a problem for a SynRM, great advantages can be achieved by balancing temperatures between opposite ends of the machine and within individual rotor disks. The inherent rotor structure of a SynRM enables accomplishing this temperature balancing with simple means.

According to a first aspect of the invention, there is provided a synchronous reluctance machine comprising a rotor having a plurality of rotor disks. Each rotor disk comprises a plurality of longitudinal flux barriers configured to give the rotor an anisotropic magnetic structure. The rotor disks are stacked together to form a rotor core in such a way that the flux barriers define channels extending in an axial direction of the rotor core. Air is forced to flow through the channels. By causing air to flow through the channels, temperature distribution within the machine is improved, which in turn leads e.g. to increased bearing life at a warmer end of the machine, and to decreased tensions and deformations within individual rotor disks.

According to one embodiment of the invention, the air is forced to flow through the channels in two opposite axial directions. Various simple ways of implementing the air circulation can be practiced when the air is forced to flow in both directions through the channels.

According to one embodiment of the invention, the air is forced to flow through part of the flux barriers of a rotor disk in one axial direction and through part of the flux barriers of the same rotor disk in an opposite axial direction. By causing the air to flow in both directions through the rotor disks and thereby through the whole rotor core, no additional air return flow path is required.

According to one embodiment of the invention, the air is forced to flow through a flux barrier of a rotor pole in one axial direction, and through another flux barrier of the same rotor pole in an opposite axial direction. By causing the air to flow in both directions through the flux barriers of a rotor pole, the temperature distribution between different portions of a rotor disk can be regulated more precisely.

According to one embodiment of the invention, the air from the warmer end of the machine is forced to flow through a radial innermost flux barrier of the rotor. Since typically the central portion of a rotor disk needs least cooling, it is advantageous to cause the warmest air to flow through these portions and respectively the coolest air to flow through the portions that need most cooling.

According to one embodiment of the invention, the rotor core is divided into at least two axial rotor sections arranged subsequently on a common axis and separated by an axial gap, the air being forced to flow through the channels of each of the axial rotor sections, and in a radial direction through the axial gap. By these measures a flow path and an air circulation ensuring an even temperature distribution within the machine is accomplished.

According to one embodiment of the invention, a radial fan is arranged into the axial gap. By this measure a simple means for implementing the air circulation is accomplished.

According to one embodiment of the invention, the radial fan comprises end plates with openings for directing the air flow. By directing the air flow in this way the temperature distribution between different portions of a rotor disk can be regulated even more precisely.

According to one embodiment of the invention, the radial fan comprises curved blades. With curved blades the noise generated by the fan is kept at a low level.

According to one embodiment of the invention, air is forced to flow through the channels regardless of the rotating direction of the rotor. It is advantageous to design the air circulation to occur in both rotating directions of the rotor as a typical SynRM operates in both directions.

According to one embodiment of the invention, the rotor does not comprise conductors configured to create a magnetic field on the rotor and causing resistive losses when the machine is operating. Even if the resistive losses caused by rotor conductors are not present in a pure SynRM, and thereby heating of the rotor is not conventionally recognized as a problem associated with a SynRM, great advantages mentioned hereinbefore can still be achieved by improving the temperature distribution within the machine.

According to one embodiment of the invention, the air is circulated within a machine housing, and a free exchange of air between the inside and the outside of the machine housing is prevented. By preventing free exchange of air, the air within the machine housing is less prone to be contaminated with dirt from the outside of the machine housing.

BRIEF DESCRIPTION OF THE DRAWINGS

The invention will be explained in greater detail with reference to the accompanying drawings, wherein
FIG. 3 shows an embodiment of a rotor with blades and covers;
FIG. 4 shows an embodiment of a rotor with a fan.

DETAILED DESCRIPTION OF THE INVENTION

Figure 1:
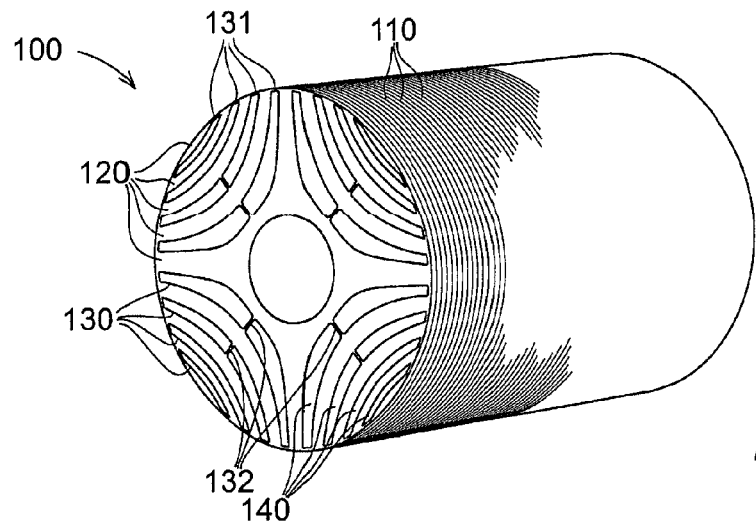
FIG. 1 shows a rotor of a SynRM.

Referring to FIG. 1, a rotor of a SynRM comprises a plurality of rotor disks 110. Each rotor disk 110 has a plurality of longitudinal flux paths 120 separated by flux barriers 130 in the form of openings filled by air. The flux barriers 130 are configured to give the rotor an anisotropic magnetic structure defining a certain number of magnetic rotor poles. In the embodiment of FIG. 1 the rotor pole number is four. The flux paths 120 are connected to one another by narrow tangential ribs 131 at the disk periphery, and some of them are additionally connected with radial bridges 132 crossing the flux barriers 130 in the middle. When the rotor disks 110 are stacked together to form a rotor core 100, the flux barriers 130 define channels 140 extending in an axial direction of the rotor core 100. According to the present invention, air is forced to flow through these channels 140 in order to enable a substantially uniform temperature distribution between the opposite axial ends of the machine.

Figure 2:
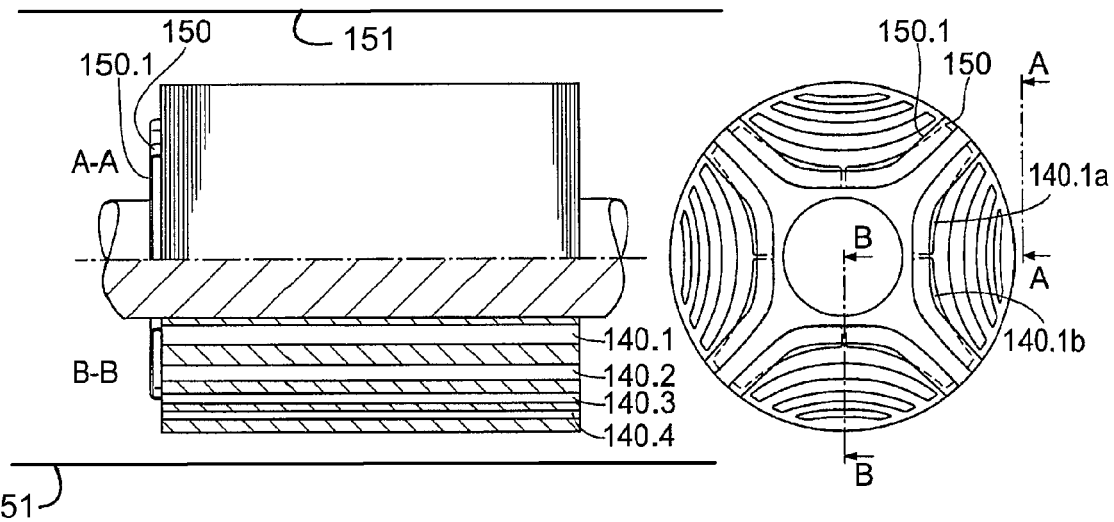
FIG. 2 shows an embodiment of a rotor with wings.
Figure 2:
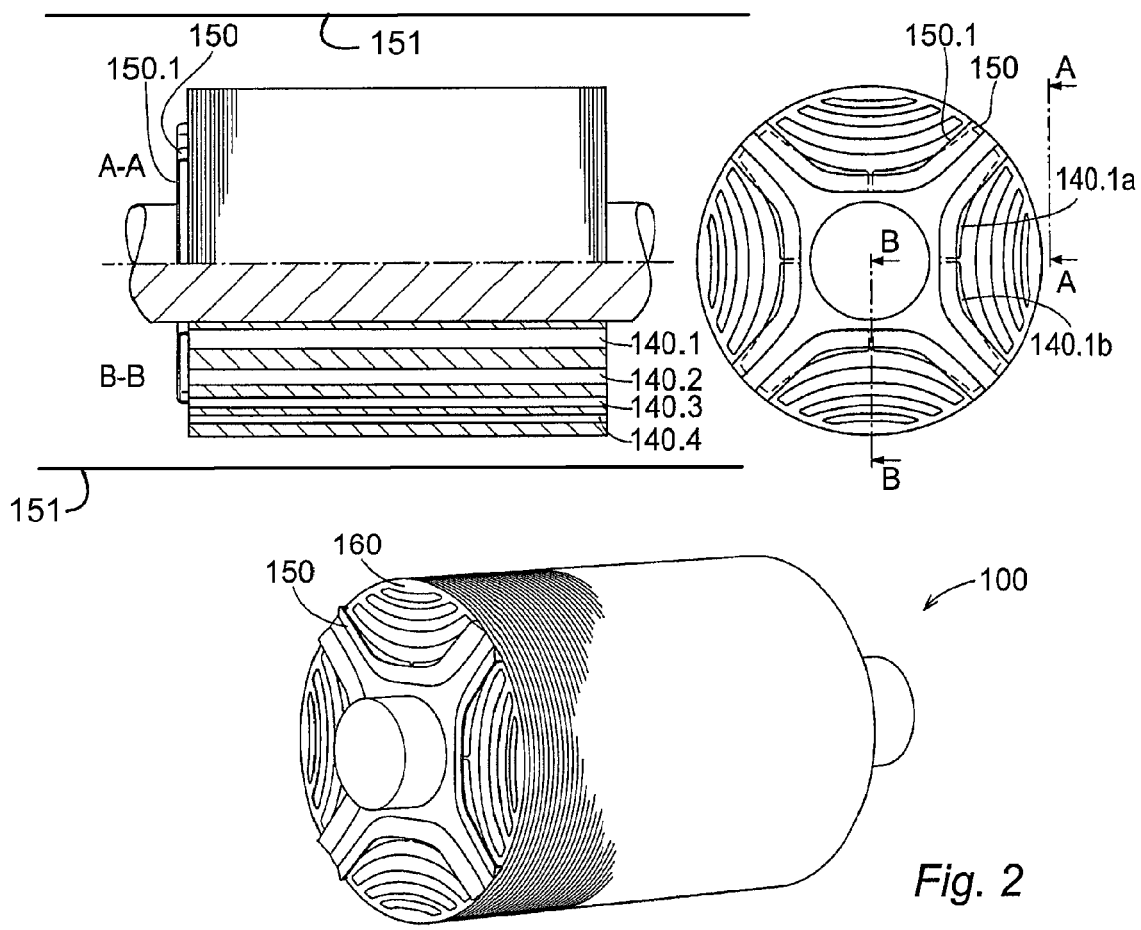

FIG. 2 shows a first means for forcing air to flow through the channels 140. One axial end surface 160 of the rotor core 100 is provided with wings 150 that push air through the radial innermost channels 140.1. In the embodiment of FIG. 2 only the radial innermost channels 140.1 are provided with wings 150, but it is possible to provide any of the remaining channels 140.2, 140.3, 140.4 with corresponding wings 150. The wings 150 are generally following the shape of the flux barriers 130, and they have one edge 150.1 elevated from the axial end surface 160 of the rotor core 100. The wings 150 are configured such that one part of the elevated edge is functioning as a leading edge when the rotor is rotating clockwise, and the remaining part of the elevated edge is functioning as a leading edge when the rotor is rotating counter clockwise.

When the rotor of FIG. 2 is rotating in any direction, the wings 150 cause air to flow in one axial direction through first flanks 140.1a of the radial innermost channels 140.1, and the air to return in an opposite axial direction through the remaining channels 140.2, 140.3, 140.4 including second flanks 140.1b of the radial innermost channels 140.1. A corresponding air circulation occurs when the rotor is rotating in the opposite direction. The air is thereby caused to circulate between the N-side and the D-side of the machine, the air circulation being equally effective regardless of the rotating direction. Instead of having one wing 150 extending over the whole length of a flux barrier 130, the wing parts functioning in different rotating directions can be implemented as two or more separate wings 150. If the rotor is designed to rotate in one direction only, part of the wings 150 can be omitted or configured anew to cause air circulation with the chosen rotating direction.

In order to make the air circulation more efficient, both axial end surfaces 160 of the rotor core 100 can be provided with wings 150. For example, one axial end surface 160 of the rotor core 100 may be provided with wings 150 that cause the air to circulate when the rotor is rotating clockwise, and the opposite axial end surface 160 of the rotor core 100 may be provided with corresponding wings 150 that cause the air to circulate when the rotor is rotating counter clockwise. Any combination of wings 150 which causes the air to circulate between N-side and D-side of the machine can be used.

The wings 150 can be of any shape appropriate for causing the air circulation. Especially, the wings 150 do not need to be inclined but a straight edge perpendicular to the axial end surfaces 160 may also constitute a wing 150. In one embodiment of the invention the rotor 100 comprises in its one axial end a 5 mm thick end plate with straight edged radial spokes between the rotor poles, the spokes functioning as wings 150 in the meaning of the present disclosure.

It is essential for the accomplishment of the air circulation that there is a speed difference between the wings 150 and the air surrounding the wings 150. Obviously an air whirl within the machine housing 151 should be substantially prevented such that a necessary speed difference is effectively maintained during the operation of the machine.

The direction of the air flow through individual channels 140 may also have significance. For the sake of an example it can be assumed that the machine has an external fan at the N-side of the same. The N-side is therefore cooler than the D-side. On the other hand during operation of the machine the radial outermost flux paths 120 tend to become warmer than the central portion of the rotor disks 110. This is because the central portion has a large heat conducting area towards the rotor shaft that acts as a heat sink while the remaining flux paths 120 are connected to the rotor shaft only via the tangential ribs 131 or the radial bridges 132 that do not provide an adequate heat conducting capacity. Consequently, the radial outermost flux paths 120 need more cooling than the central portion, and it is therefore advantageous to let the cooler air from the N-side to flow through the radial outermost channels 140.2, 140.3, 140.4 while letting the return flow from the D-side to occur through the radial innermost channels 140.1. However, as the whole purpose of the present invention is to balance the temperature distribution between the opposite machine ends, the influence of the flow direction may remain quite marginal.

As is clear from the foregoing, the air circulation does not only balance the temperature distribution between the opposite machine ends, but it also balances the temperature distribution within individual rotor disks 110. As a consequence mechanical tensions and deformation of the rotor disks 110 are reduced, and a more durable rotor is achieved.

FIG. 3 shows a second means for forcing air to flow through the channels 140. This second means makes use of centrifugal phenomenon with help of radial blades 170 and shallow covers 180 covering part of the channels 140 at one end surface 160 of the rotor core 100. The blades 170 of a rotating rotor push the air outwards and thereby cause the air to circulate. In the example of FIG. 3 the blades 170 are drawing the air through the second channels 140.2 counted in the radial direction from the shaft opening 190. The air is returning partly through the third and the fourth channels 140.3, 140.4, but mainly through the first channels 140.1 closest to the shaft opening 190. In the case where it is the radial outermost flux paths 120 that need most cooling, the blades 170 of the example should be situated at the warmer end of the machine.

Instead of covering only the three radial outermost flux barriers 130 according to FIG. 3, the blades 170 and the cover 180 may embrace all four channels 140 of a rotor pole. In such a case preferably only the channels 140 of every second rotor pole are covered such that the channels 140 of the remaining poles function as return flow paths for the air.

FIG. 4 shows a third means for forcing air to flow through the channels 140. The rotor core 100 is divided into two axial rotor sections 200a, 200b arranged subsequently on a common axis 210 and separated by an axial gap 220. A radial fan 230 in the form of radial fan blades 240 between two circular end plates 250 is arranged into the axial gap 220. When the rotor is rotating, the fan 230 causes the air pressure in the axial gap 220 to increase in radial direction from the shaft opening 190 outwards. The end plates 250 are provided with suitable flow openings 260 to allow the air to flow through the first channels 140.1 towards the fan 230, in radial outward direction along the axial gap 220, and further through the remaining channels 140.2, 140.3, 140.4 away from the fan 230. A substantially uniform temperature distribution between the opposite axial ends of the machine is achieved by letting the air flow from the N-side and D-side of the machine to be mixed in the axial gap 220.

The flow openings 260 at the end plates 250 can be modified in order to further direct the air flow. For example, if an increased air flow through the fourth channels 140.4 is desired, the end plates 250 can be provided with return flow openings 260 only at these fourth channels 140.4 while letting the end plates 250 fully cover the second and third channels 140.2, 140.3. Alternatively, the air flow away from the fan 230 can be directed through the stator of the machine or between the stator and the machine housing 251. In such a case also the stator may have an axial gap providing a radial flow path. Moreover, axial flow paths may be provided through the stator or radial outside of the stator.

Figure 5:
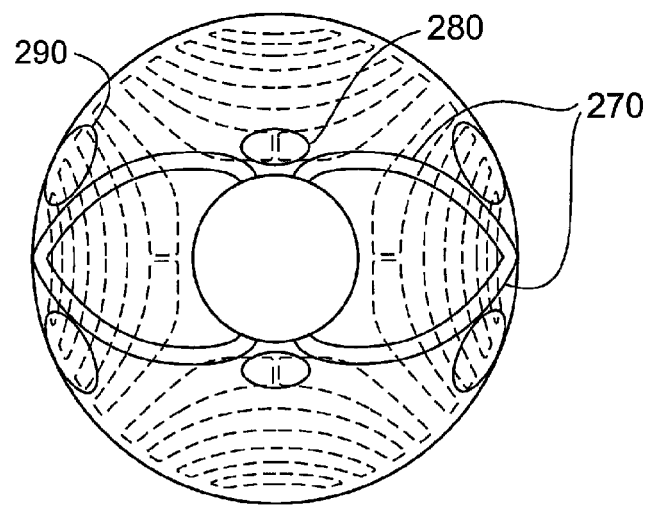
FIG. 5 shows an embodiment of a fan.

The fan blades 240 in FIG. 4 are illustrated as being straight, but the fan blades 240 can take any appropriate shape which causes the air to flow in the radial outward direction in the axial gap 220. A curved blade shape is preferred because such a shape decreases the noise caused by the fan 230. Preferably, the fan 230 is configured to cause an equally effective air circulation regardless of the rotating direction of the rotor. One such fan configuration with curved blades 270 is illustrated in FIG. 5. The end plates 250 of this fan 230 have one inlet opening 280 per one pair of blades 270, and one outlet opening 290 for each blade 270. The inlet opening 280 is effective in an equal manner regardless of the rotating direction of the rotor, but only two of the blades 270 and outlet openings 290 are effective at a time depending on the rotating direction.

The invention is primarily directed for balancing temperature distribution within a closed machine housing wherein a free exchange of air between the inside and the outside of the machine housing is prevented. It is, however, not excluded to introduce fresh air from outside of the machine housing, or to use an external heat exchanger to further cool down the circulated air.

The invention is not limited to the embodiments shown above, but the person skilled in the art may, of course, modify them in a plurality of ways within the scope of the invention as defined by the claims.

What is claimed is:

1. A synchronous reluctance machine comprising:
    a rotor having a plurality of rotor disks, each rotor disk comprising a plurality of longitudinal flux barriers configured to give the rotor an anisotropic magnetic structure, the rotor disks being stacked together to form a rotor core in such a way that the flux barriers define channels extending in an axial direction of the rotor core,
    wherein air is forced to flow through a flux barrier of a rotor pole in one axial direction, and through another flux barrier of the same rotor pole in an opposite axial direction.

2. The synchronous reluctance machine according to claim 1, wherein the air is forced to flow through part of the flux barriers of a rotor disk in one axial direction and through part of the flux barriers of the same rotor disk in an opposite axial direction.

3. The synchronous reluctance machine according to claim 1, wherein the air from the warmer end of the machine is forced to flow through a radial innermost flux barrier of the rotor.

4. The synchronous reluctance machine according to claim 1, wherein the rotor core is divided into at least two axial rotor sections arranged subsequently on a common axis and separated by an axial gap, the air being forced to flow through the channels of each of the axial rotor sections, and in a radial direction through the axial gap.

5. The synchronous reluctance machine according to claim 4, wherein a radial fan is arranged into the axial gap.

6. The synchronous reluctance machine according to claim 5, wherein the radial fan comprises end plates with openings for directing the air flow.

7. The synchronous reluctance machine according to claim 6 wherein the radial fan comprises curved blades.

8. The synchronous reluctance machine according to claim 1, wherein air is forced to flow through the channels regardless of the rotating direction of the rotor.

9. The synchronous reluctance machine according to claim 1, wherein the rotor does not comprise conductors configured to create a magnetic field on the rotor and causing resistive losses when the machine is operating.

10. The synchronous reluctance machine according to claim 1, wherein the air is circulated within a machine housing, and a free exchange of air between the inside and the outside of the machine housing is prevented.

11. A synchronous reluctance machine comprising:
    a rotor having a plurality of rotor disks, each rotor disk comprising a plurality of longitudinal flux barriers configured to give the rotor an anisotropic magnetic structure, the rotor disks being stacked together to form a rotor core such that the flux barriers define channels extending in an axial direction of the rotor core;

said rotor core is formed into two axial rotor sections positioned on a common axis with an axial gap separating the two axial rotor sections;

a radial fan positioned in the axial gap with openings for directing the air flow, said radial fan forcing air to flow through the channels of each of the axial rotor sections, and in a radial direction through the axial gap;

wherein air is forced to flow through channels of each of the axial rotor section and in a radial direction through the gap, said air flows through a flux barrier of a rotor pole in one axial direction, and through another flux barrier of the same rotor pole in an opposite axial direction.

* * * * *